United States Patent [19]

Woolf et al.

[11] 3,761,501

[45] Sept. 25, 1973

[54] PERFLUOROALKYL CYANATES

[75] Inventors: Cyril Woolf; Robert E. A. Dear, both of Morristown; David E. Young, Denville, all of N.J.

[73] Assignee: Allied Chemical Corporation, New York, N.Y.

[22] Filed: June 2, 1971

[21] Appl. No.: 149,347

[52] U.S. Cl. ........ 260/453 AL, 117/138.5, 117/154, 260/453 P, 260/564 R, 260/593 A, 260/633
[51] Int. Cl. .......................................... C07c 119/04
[58] Field of Search .................. 260/453 AL, 453 P

[56] References Cited
OTHER PUBLICATIONS

Krespan: J. Org. Chem. 34(5), pp. 1278–1281 (1969).

*Primary Examiner*—Lewis Gotts
*Assistant Examiner*—Dolph H. Torrence
*Attorney*—Arthur J. Plantamura and Stanley M. Teigland

[57] ABSTRACT

Tertiary perfluoroalkyl cyanates are prepared by reacting the corresponding tertiary perfluoroalkoxide with cyanogen chloride or cyanogen bromide. The cyanates are novel compounds useful as intermediates in the preparation of low surface energy compounds useful as repellent coatings.

5 Claims, No Drawings

PERFLUOROALKYL CYANATES

BACKGROUND OF THE INVENTION

The synthesis of organo cyanates was reported in 1964 by three independent pairs of researchers. Jensen and Holm in Acta Chem. Scand., 18, 826 (1964) reported the preparation of phenyl and ethyl cyanate by thermolysis of phenoxy- and ethoxy-1,2, 3,4-thiatriazole. Kauer and Henderson in J. Org. Chem., 86, 4732 (1964) reported the preparation of bicyclo[2.2.2]octyl-1,4-dicyanate, 3-ethoxy 2,2,4,4-tetramethylcyclobutyl cyanate and neopentyl cyanate by treating the corresponding alcohol with sodium hydride and then cyanogen chloride. Grigat and Putter in Chem. Ber. 97, 3012 (1964) reported the preparation of 63 organo cyanates, of which 58 were aryl cyanates and 4 were 2,2,2,-trihaloethylcyanates. These cyanates were prepared by reacting the corresponding hydroxy compound, e.g., phenol, with cyanogen chloride in the presence of a base such as triethylamine. This work is also the subject of U.S. Pat. No. 3,553,244.

The method of Kauer and Henderson was employed by Timberlake and Martin in J. Org. Chem. 33, 4054 (1968) to prepare cyclopropylcarbinyl isocyanates from the corresponding cyclopropylcarbinols. No cyanates were obtained.

The preparation of α-methylhexafluoroisopropyl cyanate by reacting 2-methylhexafluoro-2-propanol with sodium hydride and then cyanogen chloride was reported by Krespan in J. Org. Chem. 34, 1278 (1969). On being heated in dimethylacetamide, the cyanate decomposed to 1,1-bis(trifluoromethyl) ethylene. Although Krespan recites that negative substitutents on an alkyl moiety tend to stabilize cyanates, an attempt by Krespan to prepare a cyanate from 2-phenylhexafluoro-2-propanol was not successful. Similarly, when the potassium salt of perfluoroisopropanol is reacted with cyanogen chloride, an isocyanate rather than a cyanate is obtained, as disclosed in copending application Ser. No. 14,652 filed Feb. 26, 1970.

It is an object of this invention to provide a novel class of stable organo cyanates. Another object of this invention is to provide organo cyanates which are particularly useful as intermediates in the preparation of low surface energy compounds useful as repellent coatings.

SUMMARY OF THE INVENTION

This invention provides novel tertiary perfluoroalkyl cyanates having the formula

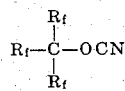

wherein each $R_f$ is independently a perfluoroalkyl radical of 1 to 6 carbon atoms. The total number of carbon atoms in the cyanate preferably ranges from 5 to 15, more preferably 5 to 10.

The cyanates of this invention are prepared by reacting the corresponding tertiary perfluoroalkoxide with a cyanogen halide, as represented by the following equation:

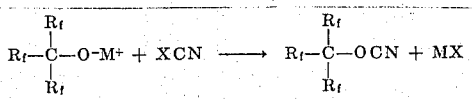

wherein M represents the cation portion of the alkoxide and X represents a halogen. M is preferably an alkali metal, more preferably sodium or potassium. X is preferably chlorine or bromine, more preferably chlorine. The reaction is preferably carried out under substantially anhydrous conditions in an aprotic reaction medium. The cyanate product is recovered from the reaction mixture in accordance with conventional methods, such as fractional distillation.

The reaction is conveniently carried out at room temperature, but temperatures above or below room temperature, such as from about −40°C. to about 100°C., can be employed if desired. The preferred reaction temperature is from about −30°C. to about 25°C. The pressure employed is not critical and can be above or below atmospheric pressure as desired. The reaction is conveniently carried out at pressures autogenously developed at the reaction temperatures employed.

Suitable aprotic reaction media include acetonitrile, dimethylformamide, hexamethylphosphoroamide, nitrobenzene, polyethers, polymethylene sulfones, and the like.

The tertiary perfluoroalkoxide reactants are known compounds. They can be prepared by reacting the corresponding tertiary alcohol with an alkali metal or hydride thereof. They can be prepared by reacting a perfluoroketone with a perfluoroolefin in the presence of a metal fluoride as described in U.S. Pat. No. 3,317,615.

The cyanates of this invention can be reacted with amines and diamines to form iminocarbamates, as represented by the following equation:

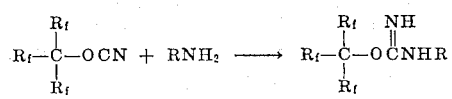

The reaction, which is exothermic, is conveniently carried out between about 0°C. and 30°C., preferably in the presence of an aprotic liquid diluent, such as diethyl ether. Suitable diamines include those having the formula $H_2N(CH_2)_nNR_1R_2$ wherein $n$ is an integer from 2 to 10 and $R_1$ and $R_2$ are independently hydrogen or alkyl radicals having from 1 to 6 carbon atoms. Iminocarbamates derived from such diamines are useful as oil repellent coatings. The coatings are applied to the substrate to be rendered oil repellent in accordance with conventional methods for applying such coatings, e.g., by permitting a solution of the iminocarbamate in a suitable solvent, such as ethanol, to dry on the substrate, which may be paper or a fabric.

The following examples further illustrate the invention. In each example the reaction was carried out under substantially anhydrous conditions. The products were identified in accordance with modern analytical techniques.

EXAMPLE 1

To a stirred suspension of 29 grams of potassium fluoride in 150 ml of diglyme at −78°C., there was added 89.3 grams of hexafluoroacetone. After the reaction mixture had been heated to 70°C., hexafluoropropylene was added periodically at pressures uo to 80 psig.

A total of 107 grams of hexafluoropropylene was added in order to drive the following reaction to completion $(CF_3)_2CO + KF + CF_3CF=CF_2 \rightarrow FC(CF_3)_2C(CF_3)_2O^- K^+$ Unreacted hexafluoropropylene (including dimers and trimers thereof) was removed at 50°C. and 120 mm Hg. A total of 30.8 grams of cyanogen chloride was then passed into the reaction mixture at 5°C. After the reaction mixture had been stirred for several hours, it was fractionally distilled to produce 37.9 grams of perfluoro-2,3-dimethyl-2-butyl cyanate (boiling point 105°–107°C.).

EXAMPLE 2

Equimolar amounts of ClCN and $(CF_3)_2CO^-Na^+$ were reacted at 25°C. in dioxane. A white precipitate (NaCl) developed as perfluoro-t-butyl cyanate formed. The cyanate was recovered by fractional distillation and purified by gas chromatography at 80°C. The yield of cyanate was 83 percent.

EXAMPLE 3

Two grams of N-methylethylene diamine were added to a solution of 9 grams of perfluoro-2,3-dimethyl-2-butyl cyanate in 30 ml. of dry ethyl ether at 0°C. The reaction mixture was then stirred for 18 hours at room temperature. After removing the ether by vacuum distillation, eight grams of crude imino-carbamate product was obtained. The crude product was dissolved in ethanol to form a 5 percent by weight solution. Filter paper was saturated with the solution, drained, and air dried at room temperature. The filter paper had an oil-repellency rating of between 60 and 70 by the test described on pages 323–4 of the April, 1962 edition of the Textile Research Journal. This test involves gently placing on the treated material drops of mixtures of mineral oil ("Nujol") and n-heptane in varying proportions. The drops are allowed to stand on the treated material undisturbed for 3 minutes. After the 3 minute time period the wetting and penetration of the material is visually observed. The number corresponding to the mixture containing the highest percentage of heptane which does not penetrate or wet the material is considered to be the oil-repellency rating of the treated material.

We claim:

1. A tertiary perfluoroalkyl cyanate having the formula

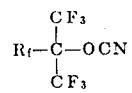

wherein $R_f$ is a perfluoroalkyl radical of 1 to 6 carbon atoms.

2. The cyanate of claim 1 wherein the cyanate is perfluoro-t-butyl cyanate.

3. The cyanate of claim 1 wherein the cyanate is perfluoro-2,4-dimethyl-2-butyl cyanate.

4. A process for preparing a perfluoroalkyl cyanate

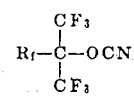

wherein $R_f$ is a perfluoroalkyl radical of 1 to 6 carbon atoms, which process comprises reacting a tertiary perfluoroalkoxide having the formula

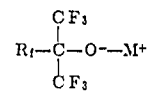

wherein $R_f$ is as defined above and M is an alkali metal, with cyanogen chloride or cyanogen bromide in an aprotic reaction medium under substantially anhydrous conditions and at a temperature of from about −40°C to about 100°C.

5. The process of claim 4 wherein M is sodium or potassium.

* * * * *